US008411278B2

(12) United States Patent  (10) Patent No.: US 8,411,278 B2
Parks et al.  (45) Date of Patent: Apr. 2, 2013

(54) MEASUREMENT OF SMALL ACCELERATIONS BY OPTICAL WEAK VALUE AMPLIFICATION

(75) Inventors: Allen D. Parks, Spotsylvania, VA (US); Scott E. Spence, Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 17 days.

(21) Appl. No.: 13/136,902

(22) Filed: Jul. 26, 2011

(65) Prior Publication Data

US 2013/0027710 A1  Jan. 31, 2013

(51) Int. Cl.
*G01B 9/02* (2006.01)
*G01B 11/02* (2006.01)
*G01P 3/36* (2006.01)

(52) U.S. Cl. ....... 356/450; 356/28.5; 356/482; 356/493; 356/498

(58) Field of Classification Search .......... 356/28.5, 356/450, 482, 493, 498
See application file for complete search history.

(56) References Cited

U.S. PATENT DOCUMENTS

| | | | |
|---|---|---|---|
| 5,276,500 A | 1/1994 | Koehler | 356/452 |
| 5,732,139 A | 3/1998 | Lo et al. | 380/28 |
| 5,999,285 A | 12/1999 | Brandt et al. | 359/112 |
| 6,325,172 B1 * | 12/2001 | Langridge et al. | 181/122 |
| 6,886,404 B2 * | 5/2005 | Digonnet et al. | 73/514.27 |
| 6,921,894 B2 | 7/2005 | Swierkowski | 250/227.21 |
| 7,013,729 B2 | 3/2006 | Knudsen et al. | 73/514.26 |
| 7,551,295 B2 | 6/2009 | Carr et al. | 356/506 |
| 7,808,618 B1 | 10/2010 | Tawney et al. | 356/28.5 |
| 7,929,143 B2 | 4/2011 | Wilfinger et al. | 356/460 |

OTHER PUBLICATIONS

G. G. Gillett el at., "Experimental Feedback Control of Quantum Systems Using Weak Measurements", *Phys. Rev. Lttrs.* 104 (8) 080503(4) (2010).http://arxiv.org/PS_cache/arxiv/pdf/0911/0911.3698v2.pdf.
A. D. Parks et aL, "Exact Pointer Properties for Quantum System Projector Measurements with Application to Weak Measurements and their Accuracy", http://arxiv.org/PS_cache/physics/pdf/1010.1010.2435v1.pdf.

* cited by examiner

*Primary Examiner* — Gregory J Toatley
*Assistant Examiner* — Hina F Ayub
(74) *Attorney, Agent, or Firm* — Gerhard W. Thielman, Esq

(57) ABSTRACT

An accelerometer instrument is provided for measuring acceleration. The instrument includes a laser, a Mach-Zender interferometer (MZI), a mechanical spring, a detector, a camera, and an analyzer. The laser emits a coherent light beam of photons. The MZI includes first and second beam-splitters along with first and second mirrors. The first mirror has an established mass m and connects to the spring for vibrating substantially perpendicular to its reflection plane. The mechanical spring has an established spring constant k. The MZI has an established weak measurement $N_w$ based on a known offset ϵ for the beam-splitters. The detector detects the beam beyond the second beam-splitter. The camera provides a pointer measurement shift δq of the photons. The camera is disposed after the detector. The analyzer determines the acceleration α based on $$a = \left(\frac{k}{mN_w}\right)\delta q.$$

4 Claims, 2 Drawing Sheets

MEASUREMENT OF SMALL ACCELERATIONS BY OPTICAL WEAK VALUE AMPLIFICATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to quantum accelerometers. In particular, high accuracy is necessary for determining miniscule accelerations.

Conventional techniques for measuring acceleration experience limitations in response at high frequency as well as magnitude for small scale changes. An accelerometer measures temporal change of velocity in an inertial reference. Generally, accelerometers have practical limitations in how quickly they respond to changes in acceleration, and thus cannot respond to changes above a certain frequency of change.

SUMMARY

Conventional accelerometers yield disadvantages addressed by various exemplary embodiments of the present invention. In particular, an accelerometer instrument is provided for measuring acceleration. The instrument includes a laser, a Mach-Zender interferometer (MZI) with a mirror of known mass attached to a mechanical spring, a detector/camera, and an analyzer. The laser emits a coherent light beam of photons. The MZI includes first and second beam-splitters along with first and second mirrors. The first mirror has an established mass m and connects to the spring for vibrating substantially perpendicular to its reflection plane. The mechanical spring has an established spring constant k.

In various exemplary embodiments, the MZI has an established weak value $N_w$ associated with the photons in the MZI and based on a known offset $\epsilon$ for the two beam-splitters. The camera images the beam beyond the second beam-splitter and provides a pointer position measurement shift $\delta q$ of the photon intensity profile. The analyzer determines the acceleration $\alpha$ based on $$a = \left(\frac{k}{mN_w}\right)\delta q.$$

Other various embodiments alternatively or additionally provide the weak measurement $N_w$ being approximated as $$N_w \approx \frac{1}{2\varepsilon}.$$

In these embodiments, the acceleration becomes $$a \approx \left(\frac{2\varepsilon k}{m}\right)\delta q.$$

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Figure 1:
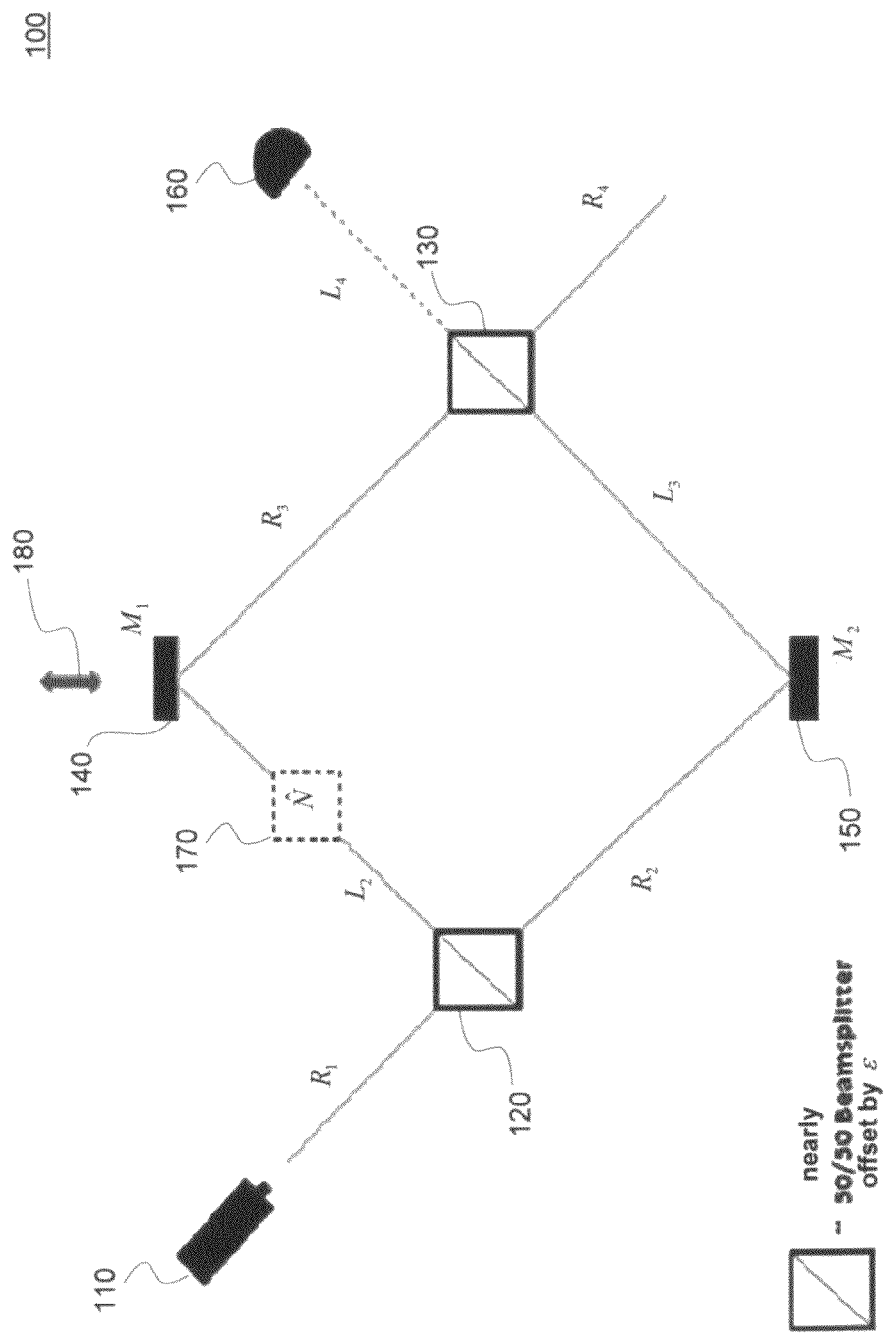
FIGS. 1 and 2 are first and second schematic views of a Mach-Zehnder interferometer.

FIG. 1 shows a schematic view 100 of a Mach-Zehnder interferometer (MZI) for use in quantum accelerometry. A laser 110 emits a coherent light beam traveling initially along path $R_1$. The MZI includes first and second 50/50 beam-splitters 120 and 130, as well as first and second reflection mirrors $M_1$ as 140 and $M_2$ as 150. A detector/camera 160 is disposed downstream of the second beam-splitter 130 along path $L_4$.

A weak measurement of the projection operator $\hat{N}$ as 170 is made by displacements of $M_1$, the first mirror 140, in a direction substantially perpendicular to the reflection surfaces as shown by a two-direction arrow 180. This operator $\hat{N}$ 170 can occur along path $L_2$ and defined subsequently by eqn. (1) between the first beam-splitter 120 and the first mirror 140.

The light beam passes from the first beam-splitter 120 along one of path $L_2$ to $M_1$ as the first mirror 140 and along path $R_2$ to $M_2$ as the second mirror 150. From the first mirror 140, the light beam passes along path $R_3$ to the second beam-splitter 130. Similarly, from the second mirror 150, the light beam passes along path $L_3$ to the second beam-splitter 130. The detector/camera 160 observes the recombined light beam that travels from the second beam-splitter 130 across path $L_4$.

Consider the labeled schematic 100 for the MZI shown in FIG. 1.

Here, the beam-splitters 120 and 130 have nearly 50/50 ratios for reflection and transmission with an effective $\epsilon$ offset from 50/50 in order to produce slight misalignment in the MZI. Consequently, when the MZI can be tuned so that all photons from the laser beam entering the MZI along path $R_1$ exit the MZI along path $R_4$ (i.e., the bright port), a very small number of them exit along path $L_4$ (i.e., the dark port).

The first mirror $M_1$ 140 is moveable in the directions indicated by the two-way arrow 180, substantially perpendicular to its reflection plane. When the displacement $\gamma$ of the mirror $M_1$ from its tuned location is sufficiently small compared to photon positional uncertainty (i.e., the beam diameter), then $M_1$ induces a weak measurement of value $N_w$ on the path $L_2$. The photon occupation number operator $\hat{N}$ 170 is then defined by:

$$\hat{N} \equiv |L_2\rangle\langle L_2|. \quad (1)$$

The MZI beam-splitter (BS) and the mirror (M) forward transformations for this case, i.e., the forward $\epsilon$-transformations, for right and left paths are:

$$|R_j\rangle \xrightarrow{BS} \frac{i(1+\varepsilon)|L_{j+1}\rangle + (1-\varepsilon)|R_{j+1}\rangle}{\sqrt{(1+\varepsilon)^2 + (1-\varepsilon)^2}}, \quad (2)$$

$$|L_j\rangle \xrightarrow{BS} \frac{(1+\varepsilon)|L_{j+1}\rangle + (1-\varepsilon)|R_{j+1}\rangle}{\sqrt{(1+\varepsilon)^2 + (1-\varepsilon)^2}}, \quad (3)$$

$$|R_j\rangle \xrightarrow{M} i|L_{j+1}\rangle, \quad (4)$$

and $$|L_j\rangle \xrightarrow{M} i|R_{j+1}\rangle, \quad (5)$$

where $i \equiv \sqrt{-1}$ is the imaginary unit.

The forward propagation of mode $|R_1\rangle$ through the MZI using the forward $\epsilon$-transformations verifies that $|L_4\rangle$ is the dark port, such that:

$$|R_j\rangle \xrightarrow{Bs,M,BS} -\left[\frac{2}{(1+\varepsilon)^2+(1-\varepsilon)^2}\right][i\varepsilon(1+\varepsilon)|L_4\rangle + (1-\varepsilon)|R_4\rangle]. \quad (6)$$

Note that, as required, this yields the correct result:

$$|R_1\rangle \xrightarrow{BS,M,BS} -|R_4\rangle, \quad (7)$$

for a perfectly aligned MZI when $\epsilon=0$ (i.e., no beam-splitter offset).

In order to calculate the associated weak value of $\hat{N}$, one should determine the pre- and post-selected states. Because photons enter along path $R_1$ and the detector/camera 160 observes along the dark path $L_4$, then the forward propagation of mode $|R_1\rangle$ to where the measurement is made in $L_2$ constitutes the pre-selected state $|\psi_i\rangle$, and the backward propagation of mode $|L_4\rangle$ to where the measurement is made constitutes the post-selected state $|\psi_f\rangle$.

Applying the above forward $\epsilon$-transformations to propagate mode $|R_1\rangle$ forward to where the measurement is made yields:

$$|R_1\rangle \xrightarrow{BS} \frac{i(1+\varepsilon)|L_2\rangle + (1-\varepsilon)|R_2\rangle}{\sqrt{(1+\varepsilon)^2 + (1-\varepsilon)^2}} \equiv |\psi_i\rangle, \quad (8)$$

as the pre-selected state $|\psi_i\rangle$. Applying the backward $\epsilon$-transformations to propagate mode $|L_4\rangle$ backward to where the measurement is made yields:

$$|L_4\rangle \xrightarrow{BS,M} -\frac{\sqrt{(1+\varepsilon)^2 + (1-\varepsilon)^2}}{2(1+\varepsilon)}(|L_2\rangle + i|R_2\rangle) \equiv |\psi_f\rangle, \quad (9)$$

as the post-selected state $|\psi_f\rangle$.

Using these pre- and post-selected states with eqns. (8) and (9), the weak value $N_w$ of $\hat{N}$ 170 is found to be:

$$N_w = \frac{\langle \psi_f | L_2 \rangle \langle L_2 | \psi_i \rangle}{\langle \psi_f | \psi_i \rangle} \quad (10)$$

$$= \frac{[\langle L_2|-i\langle R_2|]|L_2\rangle\langle L_2|[i(1+\varepsilon)|L_2\rangle + (1-\varepsilon)|R_2\rangle]}{[\langle L_2|-i\langle R_2|][i(1+\varepsilon)|L_2\rangle + (1-\varepsilon)|R_2\rangle]}$$

$$= \frac{i(1+\varepsilon)}{i(1+\varepsilon) - i(1-\varepsilon)} = \frac{1+\varepsilon}{2\varepsilon} = \frac{1}{2} + \frac{1}{2\varepsilon}$$

$$\approx \frac{1}{2\varepsilon} \text{ for } \varepsilon \ll 1.$$

The final pointer position $\langle q \rangle_f$ after making a weak measurement of $\hat{N}$ 170 is therefore:

$$\langle q \rangle_f = \langle q \rangle_i + \gamma N_w \quad (11)$$

$$\approx \langle q \rangle_i + \frac{\gamma}{2\varepsilon},$$

where $\langle q \rangle_i$ is the initial pointer position. Thus, for a fixed misalignment $\epsilon$ and known initial pointer position $\langle q \rangle_i$, the final pointer position $\langle q \rangle_f$ can be used to amplify and measure displacement $\gamma$. Pointer relations are further described by A. D. Parks et al. in "Exact Pointer Properties for Quantum System Projector Measurements with Application to Weak Measurements and Their Accuracy." See http://arxiv.org/PS_cache/arxiv/pdf/1010/1010.2435v1.pdf for details.

Figure 2:
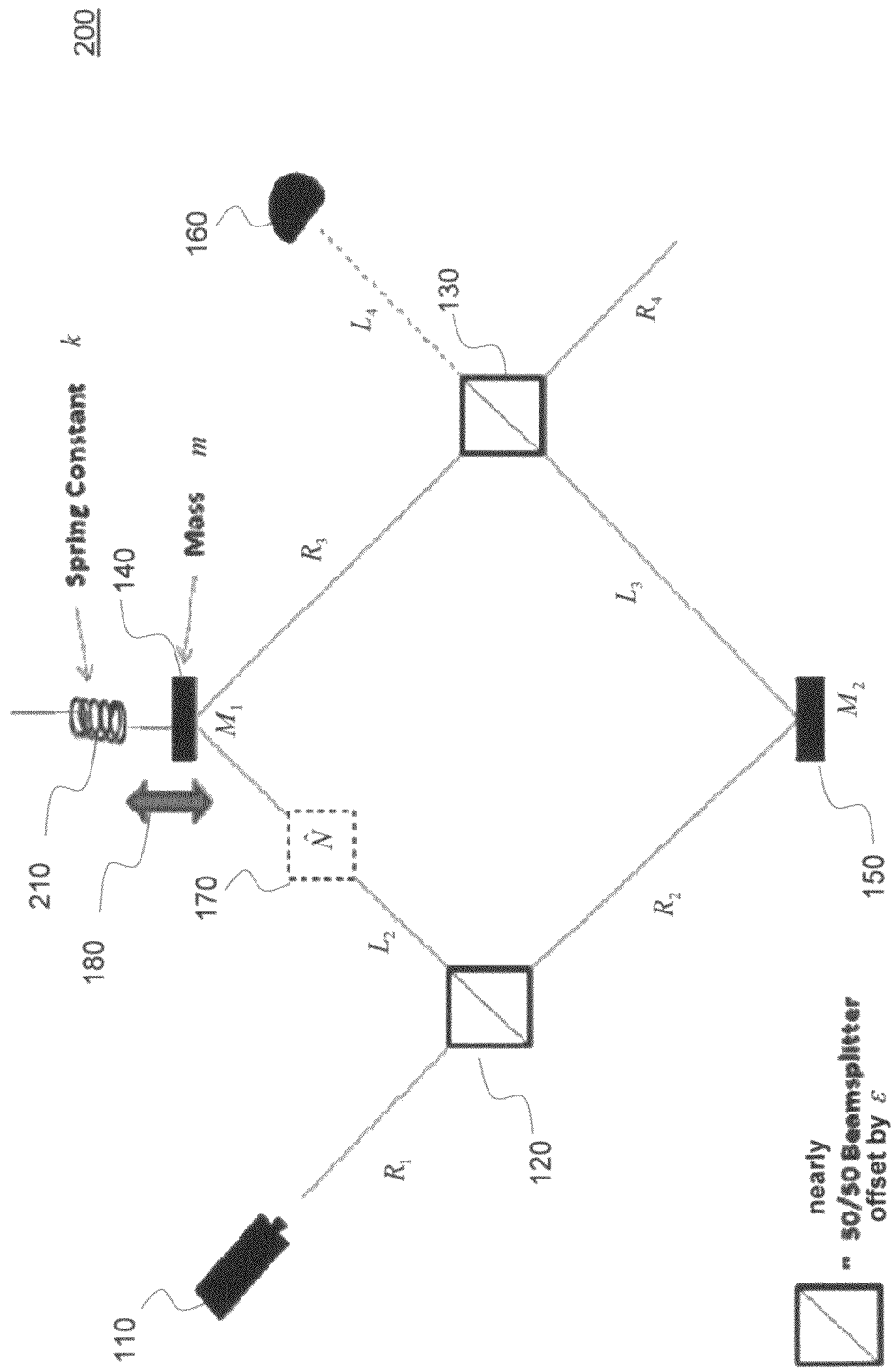

FIG. 2 shows a schematic view 200 of the MZI in which $M_1$, the first mirror 140, possesses a known mass m and can be vibrated transverse to its reflection plane and attaches to an ideal spring 210 having a known spring constant k. As a simple example of how this can be used, consider the schematic 200. The moveable mirror $M_1$ now has a known mass m and is attached to the ideal spring 210 that has k as its known spring constant.

Assume that a very small force F is applied perpendicular to the first mirror $M_1$ 140 such that the mirror is (dynamically) displaced a very small distance $\gamma$ according to Hooke's law, i.e.,:

$$F=k\gamma. \quad (12)$$

This force F shifts the position of the pointer of the apparatus according to:

$$\delta q \equiv \langle q \rangle_f - \langle q \rangle_i = \frac{F}{k} N_w = \left(\frac{m}{k}\right) a N_w, \quad (13)$$

where $\alpha$ is the acceleration. Note that the displacement $\gamma$ results from the force F applied to the mirror $M_1$. By contrast, $\epsilon$ represents a prearranged alignment offset of the beam-splitters 120 and 130 for purposes of calibrating weak measurements.

The pointer shift $\delta q$ can be measured even though the first mirror's displacement:

$$\gamma = \frac{F}{k}, \tag{14}$$

is very small. This is so because the pointer shift can be made very large by selecting the beam-splitter offset $\epsilon$ to be sufficiently small so that $N_w$ is large—i.e., $\delta q$ is amplified by the weak value $N_w$ from eqn. (10).

Using the measured value for $\delta q$ and the known values for mass m, spring constant k, and weak value $N_w$, the acceleration $\alpha$ can be determined from the expression:

$$a = \left(\frac{k}{mN_w}\right)\delta q. \tag{15}$$

This can be approximated based on the offset as:

$$a \approx \left(\frac{2\epsilon k}{m}\right)\delta q, \tag{16}$$

for $\epsilon \ll 1$.

Small integrated optics based on this concept can be fabricated and used as sensitive accelerometers. An analyzer can be used in conjunction with the associated components to determine the acceleration based on the pointer-shift measurement $\delta q$ and the known parameters using eqn. (15). In addition, these can also be employed as non-intrusive vibrometers in order to detect early warning failure signatures for operational machine components.

As a clarification, the detector/camera 160, the detector senses the beam along the (dark) path $L_4$ beyond the second beam-splitter. The camera (immediately downstream of the detector) images that beam and provides a pointer position measurement shift $\delta q$ of the photon intensity profile.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An accelerometer instrument for determining acceleration, said instrument comprising:
    a laser for emitting a coherent light beam of photons;
    a mechanical spring having an established spring constant k;
    a Mach-Zehnder interferometer (MZI) including first and second beam-splitters and first and second mirrors, said first mirror having an established mass m and connecting to said spring for vibrating substantially perpendicular to its reflection plane, said MZI having an established weak measurement $N_w$ based on a known offset $\epsilon$ for said beam-splitters;
    a camera for providing a pointer measurement shift $\delta q$ of said photons, said camera being disposed beyond said second beam-splitter; and
    an analyzer for determining the acceleration $\alpha$ based on $$a = \left(\frac{k}{mN_w}\right)\delta q.$$

2. The instrument according to claim 1, wherein for said offset such that for $\epsilon \ll 1$, said weak measurement $N_w$ is approximated as $$N_w \approx \frac{1}{2\varepsilon},$$

so that the acceleration becomes $$a \approx \left(\frac{2\varepsilon k}{m}\right)\delta q.$$

3. The instrument according to claim 1, wherein said pointer measurement shift is defined as $\delta q \equiv \langle q \rangle_f - \langle q \rangle_i$, such that $\langle q \rangle_i$ and $\langle q \rangle_f$ are initial and final pointer positions, respectively.

4. The instrument according to claim 1, further including a detector for detecting said beam beyond said second beam-splitter, said detector being disposed in conjunction with and downstream of said camera.

* * * * *